United States Patent [19]

Morrissette

[11] Patent Number: 5,758,874
[45] Date of Patent: Jun. 2, 1998

[54] UNIVERSAL VACUUM DRUM AND MASK

[75] Inventor: Roger J. Morrissette, Enfield, N.H.

[73] Assignee: Optronics International Corporation, Chelmsford, Mass.

[21] Appl. No.: 622,942

[22] Filed: Mar. 27, 1996

Related U.S. Application Data

[63] Continuation-in-part of Ser. No. 412,130, Mar. 28, 1995.

[51] Int. Cl.$^6$ ............................................. B65H 5/02
[52] U.S. Cl. ...................... 271/276; 271/196; 355/104; 355/110; 355/73; 355/91; 101/389.1; 346/138
[58] Field of Search ........................... 271/276, 196; 355/73, 85, 91, 104, 110; 101/389.1; 346/138; 399/305

[56] References Cited

U.S. PATENT DOCUMENTS

| | | | |
|---|---|---|---|
| 2,788,743 | 4/1957 | Schwerin | 101/382 |
| 3,112,698 | 12/1963 | Lake | 101/415.1 |
| 3,617,127 | 11/1971 | McDuff | 355/73 |
| 3,633,246 | 1/1972 | Kirkpatrick | 24/19 |
| 4,005,653 | 2/1977 | Arkell | 101/382 |
| 4,056,057 | 11/1977 | Smith | 101/382 |
| 4,262,594 | 4/1981 | Landsman | 101/382 |
| 4,298,278 | 11/1981 | Katakura et al. | 355/85 |
| 4,362,805 | 12/1982 | Landsman | 430/200 |
| 4,695,044 | 9/1987 | Nishihama et al. | 269/21 |
| 4,707,123 | 11/1987 | Ueyama | 355/73 |
| 4,739,361 | 4/1988 | Roy et al. | 355/3 |
| 4,899,214 | 2/1990 | Robbins et al. | 358/75 |
| 4,949,129 | 8/1990 | Fowlkes et al. | 355/274 |
| 5,088,408 | 2/1992 | Philpot | 101/415.1 |
| 5,094,164 | 3/1992 | Kowalczyk et al. | 101/401.1 |
| 5,149,082 | 9/1992 | Morita | 271/276 |
| 5,183,252 | 2/1993 | Wolber et al. | 271/276 |
| 5,243,379 | 9/1993 | Lein | 355/85 |
| 5,376,954 | 12/1994 | Kerr | 271/276 X |
| 5,383,001 | 1/1995 | Bosy | 355/73 |
| 5,402,721 | 4/1995 | Schultz | 101/389 |

FOREIGN PATENT DOCUMENTS

| | | | |
|---|---|---|---|
| 0 523 750 A1 | 12/1993 | European Pat. Off. | |
| 0 576 185 A2 | 12/1993 | European Pat. Off. | |
| 62-116073 | 5/1987 | Japan | |
| 2243058 | 9/1990 | Japan | |
| 2015962 | 9/1979 | United Kingdom | |
| 2202186 | 9/1988 | United Kingdom | 101/389.1 |
| 2274623 | 8/1994 | United Kingdom | |

OTHER PUBLICATIONS

Patent Abstracts of Japan, vol. 16, No. 531 (M-1333), Oct. 30, 1992 & JP, A.04 197915 (Seiko Epson Corp), Jul. 17, 1992 (Abstract).

*Primary Examiner*—Boris Milef
*Attorney, Agent, or Firm*—Bromberg & Sunstein LLP

[57] ABSTRACT

A vacuum drum apparatus on which a mask is mounted having a resilient surface and a plurality of holes suitable for a substrate of a given size. The vacuum drum apparatus is balanced for rotation at high speeds by attaching a counterweight to the mask. The drum is a circular cylinder perforated with an array of holes. The drum has flat surfaces on its outer surface that are used to mount the mask and the substrate on the drum. A hollow chamber within the drum is connected to a controlled pressure source for providing a vacuum. The mask may be magnetically attracted about the outer surface of the drum. Thus, the mask may be made of a flexible ferromagnetic sheet. The mask may also be staged on the drum with other mechanical type entanglements. The mask is preferably elastomeric and may include an inextensible layer.

22 Claims, 10 Drawing Sheets

UNIVERSAL VACUUM DRUM AND MASK

This application is a continuation-in-part of U.S. application Ser. No. 08/412,130 filed on Mar. 28, 1995, entitled "Variable Mask and Universal Vacuum Drum" currently pending. The present invention generally relates to plotters, scanners and similar devices that use a rotatable drum for mounting substrates (e.g., films, printing plates or documents) that are to be exposed or scanned, and particularly such devices which use vacuum drums.

BACKGROUND OF THE INVENTION

A number of prior art vacuum drums for handling different sized media involve vacuum drums provided with groove or hole arrangements along with valves or separate vacuum chambers for providing different sized areas of vacuum force over the surface of the vacuum drum. For example, U.S. Pat. No. 5,383,001 (Bosy) discloses a valving system and separate vacuum channels for handling media of different sizes. By adjusting the valves, the vacuum channels may be set to accommodate any of a number of media sizes. It is important that a vacuum be applied about the edges of media being mounted on a vacuum drum. Thus the multichambered vacuum drum invented by Bosy may only be used on media having any of the several particular sizes that the drum accommodates. Only several specific sizes are accommodated.

Likewise, U.S. Pat. No. 5,183,252 (Wolber et al.) discloses a vacuum drum with first and second evacuation zones. Each zone includes a number of vacuum holes. An embodiment is shown for accommodating two standard media sizes in which either one or both of the evacuation zones are activated.

Previous vacuum drums having only a single chamber with holes connecting the inner chamber to the surface of the drum used masks to mount smaller films on the drum. A mask was typically L-shaped to block off vacuum holes located beyond the edge of the media to be mounted on the drum. Typically, the mask was an inextensible plastic sheet adhesively attached to the vacuum drum. The sheet would block off the vacuum holes that were located beyond the edges of the media to be mounted, while the media was allowed to be mounted directly to the vacuum drum in the unmasked area.

Moreover, when loading media onto a vacuum drum it can be difficult to curve the media to the drum in order to pull the initial vacuum for loading the media. For example, the bending forces in an aluminum plate have a tendency to pop the edge of the plate off of the drum.

SUMMARY OF THE INVENTION

The present invention is directed to a vacuum drum apparatus that receives a mask which extends over all of the vacuum holes in the drum. The mask is provided with holes that define or cover an area that accepts a substrate of a given size. Substrates of different sizes may be handled on the drum simply by providing a mask with a different sized plurality of holes.

The mask of an embodiment of the invention is a flexible sheet perforated with a plurality of holes arranged so that when a substrate is mounted thereon the holes lie beneath the substrate and along within the perimeter of the substrate. The mask of another embodiment of the invention is a flexible sheet perforated with a plurality of holes arranged in an array covering an area no greater than the area of the substrate to be mounted on the vacuum drum. The holes may be formed in the mask by laser cutting in response to a computer file. A counterweight may be attached to the mask to balance the weight distribution about the vacuum drum when the substrate and mask are mounted thereon.

The mask may be adhered to the outer surface of the vacuum drum. According to an embodiment of the invention, the mask is magnetic so that it may be magnetically set in place on the outer surface of the vacuum drum. As used herein, "magnetic" is defined as "magnetized or capable of being magnetized." Thus, magnetic particles include unmagnetized iron or other ferromagnetic particles. The mask may advantageously be made elastomeric so as to act as an effective gasket to seal the vacuum holes of the drum being covered and to seal the circumference of each hole against the substrate. An inextensible layer may be included in the mask to assist in preventing the mask from deforming during rapid rotation of the vacuum drum. Each mask is also characterized by having a leading edge and a trailing edge that both may be used for mounting the mask onto the vacuum drum. Leading edge is used to refer to one edge of the mask and trailing edge is used to refer to the edge that is opposite the leading edge.

The vacuum drum apparatus of an embodiment of the invention is a circular cylinder mounted for rotation about its axis. The outer surface of the circular cylinder is provided with a plurality of holes. A low pressure is applied from within the circular cylinder through at least one of the holes. A perforated mask includes holes in fluid communication with at least one of the holes in the drum connected to the low pressure source. The mask may be removably mounted on the circular cylinder. An alternative embodiment of the drum is made of a porous material. Examples of such material are porous graphite or porous aluminum. The use of a porous material for the drum material eliminates the need for drilling holes in the surface of the drum for supplying the vacuum to the mask and substrate.

Precision spaced registration holes or pins may be provided for insuring proper alignment of the mask and the substrate on the vacuum drum. For example, for manual loading, the circular cylinder may be provided with precision spaced registration pins and the mask may have compatible precision spaced holes for mounting the mask onto the drum. Whereas, in automatic loading, the circular cylinder may be provided with precision spaced registration holes.

An additional hole or set of holes having their own suction source may be provided on the drum. This additional hole or set of holes may be used to provide suction to a leading edge of a mask as it is loaded onto the vacuum and for providing suction to a leading edge array of holes in the mask for suctioning the leading edge of substrates as they are loaded onto the vacuum drum and mask. The leading edge of a substrate may be held down even more securely by providing the drum with a flat surface in the area of the leading edge array of holes. Flat surfaces may also be added to the drum to hold either or both of the leading and trailing edges of the mask. For a nonmagnetic drum, a magnetic sheet having an array of holes and an adhesive layer may be adhesively mounted onto the outer surface of the vacuum drum. This provides the vacuum drum with a magnetic surface so that a magnetized mask may stick onto the drum. Alternatively, the drum surface itself may be made of a magnetic material.

The present invention advantageously accommodates substrates of various sizes. In order to accommodate a substrate of a different size, it is convenient to provide a mask with a corresponding plurality of holes. This is a much simpler task than reengineering a vacuum drum with appropriately sized channels, valves and evacuation zones. Moreover, the various masks can be held to the vacuum drum without mechanical clamps. The vacuum itself is sufficient to hold a mask and substrate on the drum during high speed rotation.

Other objects and advantages of the invention will become apparent during the following description of the presently preferred embodiments of the invention taken in conjunction with the drawings.

BRIEF DESCRIPTION OF THE DRAWINGS

FIG. 4a is a flat unrolled view of the outer surface of the vacuum drum of FIG. 1a.

FIG. 9c is a cross-section of a leading edge portion of the vacuum drum of FIG. 9a.

FIG. 11b is a bottom view of the mask of FIG. 11a.

DETAILED DESCRIPTION OF THE PREFERRED EMBODIMENTS

Figure 1A:
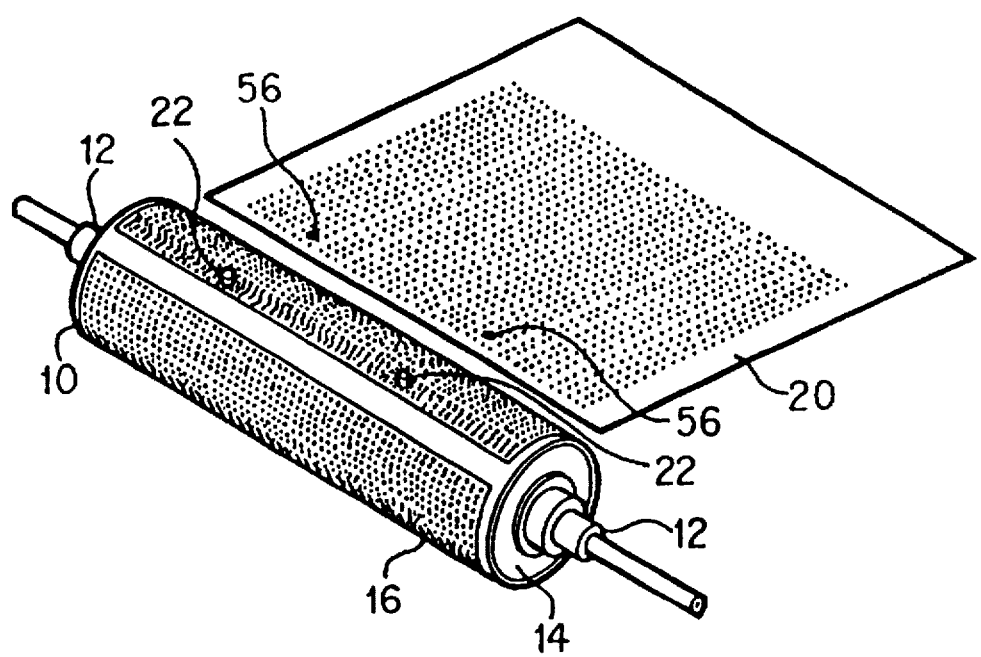
FIG. 1a is an isometric view of a vacuum drum apparatus and mask of a first embodiment of the present invention for manual loading.

Referring now to the drawings, FIG. 1a shows a vacuum drum apparatus of an embodiment of the present invention. A rotatable drum 10 for plotting or scanning is a circular cylinder. The outer surface 16 of the drum is perforated with a large plurality of holes. The rotatable drum 10 has two opposite end plates 14. A shaft 12 is press fit, welded or otherwise attached to each of the end plates 14. The drum is mounted so as to be rotatable about its axis.

A mask 20 is provided for blocking off a portion of the holes in the rotatable drum 10 and leaving other holes open to the surface. The plurality of holes 52 (shown in FIG. 5a) in the mask 20 extends over an area slightly less than that of the printing or film substrate to be applied to the drum for scanning or plotting. To facilitate manual loading of a mask 20 and a substrate onto the vacuum drum 10, the drum 10 is provided with a pair of registration pins 22. These registration pins 22 are precisely located for mating with a pair of precisely located registration holes 56 in the mask 20. The mask 20 can thus be accurately placed on the vacuum drum by placing the registration holes 56 of the mask onto the registration pins 22. Likewise a printing or film substrate can be accurately loaded onto the drum 10 by placing precision registration holes in the substrate over the registration pins 22. The registration pins 22 are outside the plotting or scanning area and thereby do not interfere with the plotting or scanning process. A separate set of registration pins may be included on the drum for the mask and for the substrate.

Figure 1B:
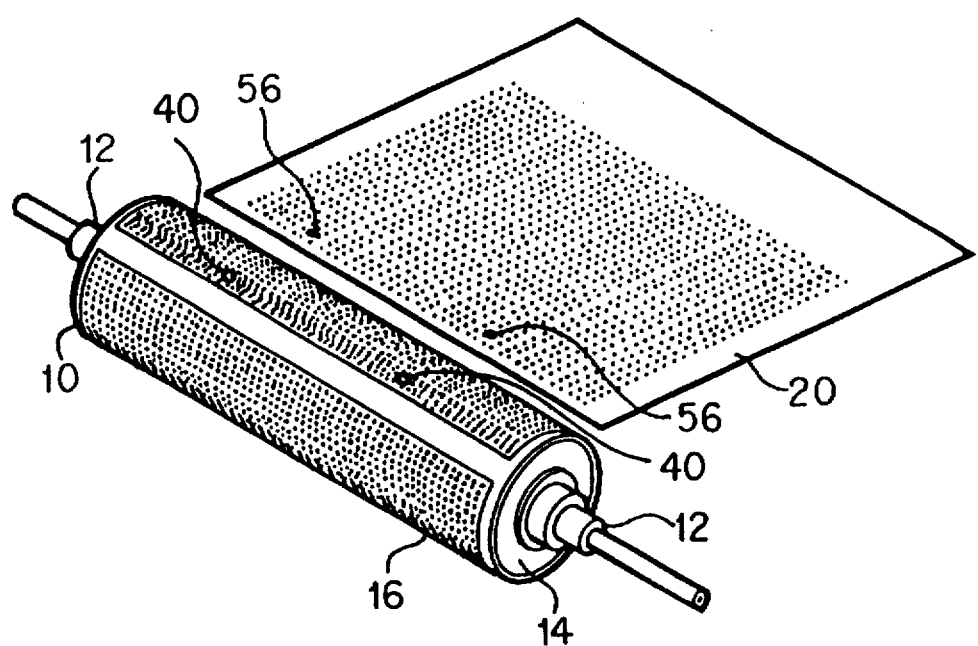
FIG. 1b is an isometric view of a vacuum drum apparatus and mask of a second embodiment of the present invention for automatic loading.

FIG. 1b is like FIG. 1a except it shows precisely located registration holes 40 in the drum surface 16 of drum 10. These registration holes 40 are used for mating with a pair of precisely located registration pins 27 used in the automatic loading process as shown in FIG. 2.

Figure 2:
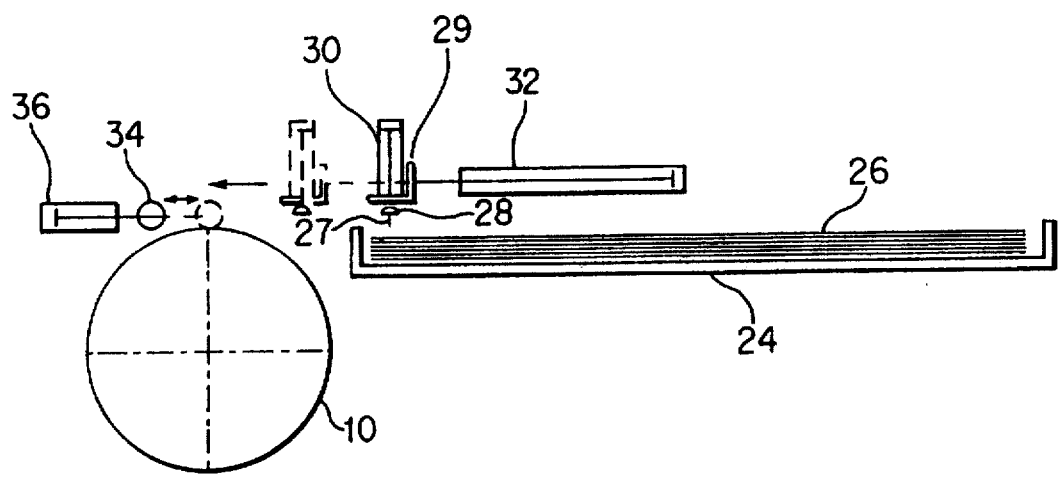
FIG. 2 is a side view schematic drawing of the vacuum drum apparatus of a second embodiment of the present invention with an automatic loading apparatus.

FIG. 2 illustrates how the vacuum drum apparatus of the present invention may be used with conventional automatic loading apparatus. A cassette or tray 24 provides an area within which a plurality of film or aluminum sheet stock substrates are stacked. A pick and place transfer carriage 29 may be provided for removing one substrate 26 at a time from the cassette or tray 24. The transfer carriage 29 may be equipped with a suction cup pick-up device 28 for attaching to one substrate 26 at a time. The suction cup device 28 rides on a cylinder 30 for lowering it into the tray 24 and lifting a substrate 26 up. A separate vacuum (not shown) is attached to the suction cup device 28 to produce the required level of vacuum. It is further convenient to provide the transfer carriage 29 with a pair of registration pins 27 rather than providing the pins on the vacuum drum 10. In this alternative embodiment, the pins 27 of the transfer carriage 29 insert through the registration holes of the substrate 26 to provide repeated accurate positioning of the substrate 26 onto the vacuum drum 10. Once the substrate 26 has been attached to the suction cup 28, a chuck cylinder 32 transports the suction cups and attached substrate 26 toward the vacuum drum 10. During loading, the vacuum drum 10 is stopped from rotation in a predetermined angular position so that the registration pins 27 on the take-up device 28 cleanly mate with the registration holes 40 in the vacuum drum 10 (as shown in FIG. 1b). A squeegee roll 34 extends across the width of the vacuum drum 10. The squeegee roll 34 is attached to a pneumatic cylinder 36 which presses the roll against the vacuum drum 10. As the drum 10 rotates, the squeegee roll 34 flattens the substrate 26 against the vacuum drum 10. As the squeegee roll 34 goes by, a vacuum is applied by the vacuum drum 10 to the leading edge of the substrate 26 being placed on the drum 10. The transfer carriage 29 is removed from the drum and the substrate 26. A full vacuum is pulled through the drum surface to hold the substrate 26 in place. When a substrate 26 is held to the vacuum drum 10 by the vacuum, the squeegee roll 34 is retracted by the cylinder 36 from the vacuum drum 10. The plotting or scanning process may then begin upon the substrate 26.

Figure 3:
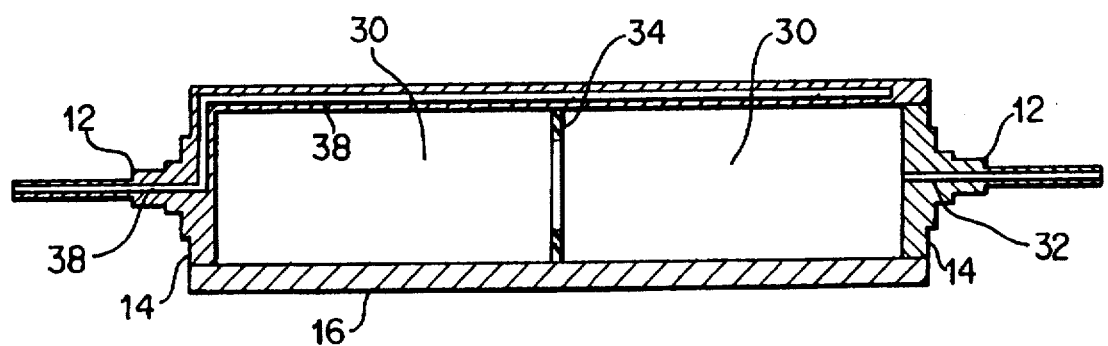
FIG. 3 is a cross-sectional view of the vacuum drum of FIGS. 1a and 1b.

Referring now to FIG. 3, a vacuum chamber 30 within the rotatable drum 10 can be seen. The large volume vacuum chamber is advantageous in that small leaks between a vacuum drum hole and the substrate 26 are unlikely to cause any significant loss of vacuum. On the other hand, the volume of the vacuum chamber 30 can be designed smaller if it is more desirable to reduce the time it takes for the vacuum to reach the outer surface of the drum. A conduit 32 is provided through one of the shafts 12 for connecting the vacuum chamber 30 of the rotatable drum 10 with a low pressure supply for effecting a vacuum within the drum 10. The low pressure supply may be controlled and provided by a vacuum pump, regulator and valve, for example. A reinforcement ring 34 is shown in the center of the drum 10. The ring 34 is open at its center to permit the vacuum to extend throughout the volume of the drum 10. The reinforcement ring 34 serves to strengthen the drum 10 so as to maintain its circular circumference throughout. The outer surface 16 of the drum 10 is perforated with holes. In the presently preferred embodiment, holes are spaced every 4.57° around the circular circumference of the drum. The holes are equally spaced across the length of the drum approximately every half inch. Each hole in the present embodiment is 0.125 inch in diameter.

Figure 4A:
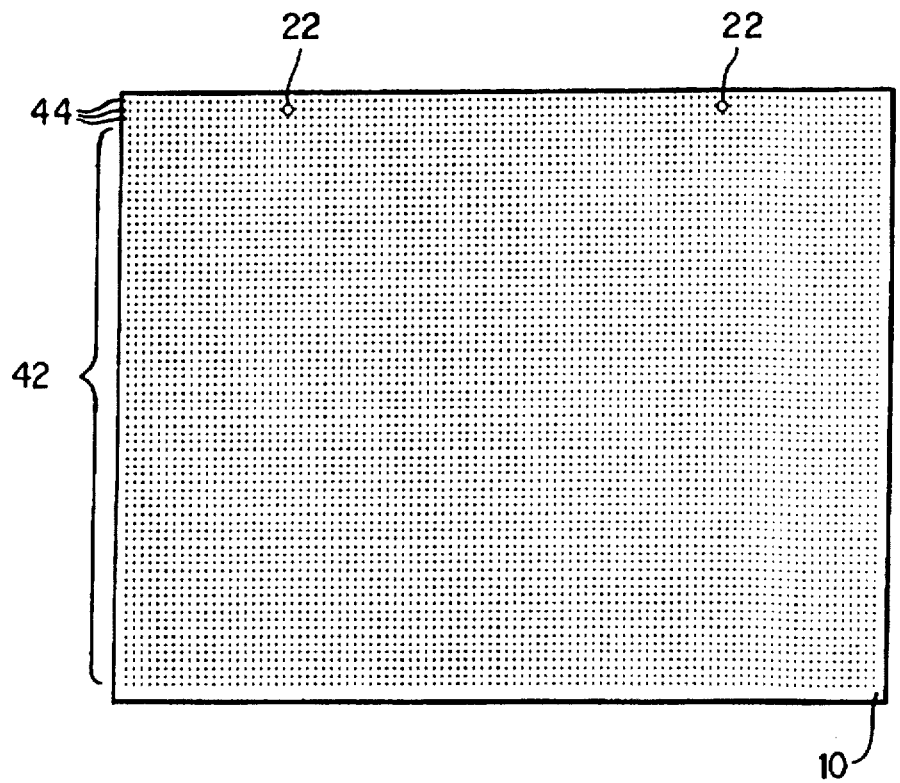
Figure 4B:
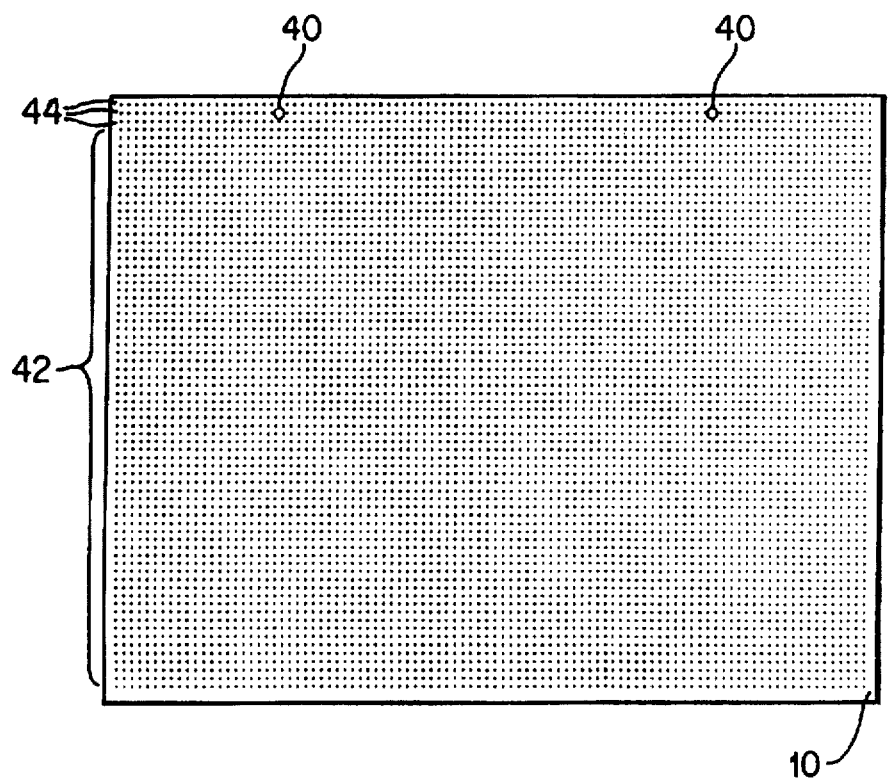
FIG. 4b is a flat unrolled view of the outer surface of the vacuum drum of FIG. 1b.

Referring now to FIGS. 4a and 4b, a first plurality of the holes 42 provide fluid communication between the outer surface 16 of the drum 10 and the inner vacuum chamber 30 of FIG. 3. Referring again to FIGS. 4a and 4b, these holes 42 are spread over a majority of the outer surface 16 of the drum 10. A second plurality of holes 44 is provided for the function of holding down the leading edge of a printing media or substrate 26. In the presently preferred embodiment, the second plurality of holes 44 constitutes three rows of holes across the drum 10. This leading edge array of holes 44 does not communicate with the inner vacuum chamber 30 of the drum 10. Rather, a conduit 38 is provided beneath the outer surface 16 of the drum 10 which connects the leading edge array of holes 44 to a second controlled low pressure source. As shown in FIG. 3, the conduit 38 leads out through the other shaft 12 supporting the rotatable drum 10. The conduit 38 extends across the drum 10 beneath its outer surface 16 and then down through an end plate 14 of the drum 10 and leaves the drum 10 axially for connection to the second controlled low pressure source.

Referring again to FIGS. 4a and 4b, located within the area covered by the second plurality of holes 44 are two precision located registration pins 22 when manual loading is used, as shown in FIG. 4a or two precision located registration holes 40 when automatic loading is used, as shown in FIG. 4b.

Manual loading may be performed by providing registration pins 22 in the vacuum drum 10, as shown in FIG. 1a. The film or printing plate can thus be manually placed on the registration pins 22 for proper orientation. The low pressure source attached to the leading edge array of holes 44 is activated once the squeegee roll 34 goes by to maintain a hold on the leading edge of the film or plate as loading is completed. The low pressure source in communication with the first plurality of holes 42 is activated simultaneously with the leading edge vacuum or shortly thereafter.

Automatic film or aluminum printing plate loading is performed with the use of registration pins 27 on a pick and place transfer carriage 29 of FIG. 2. A film or other substrate 26 to be automatically loaded on the rotatable drum 10 is carried by the registration pins 27 onto the drum 10. The pins 27 are inserted into the registration holes 40 to properly align the leading edge of the film.

Figure 5A:
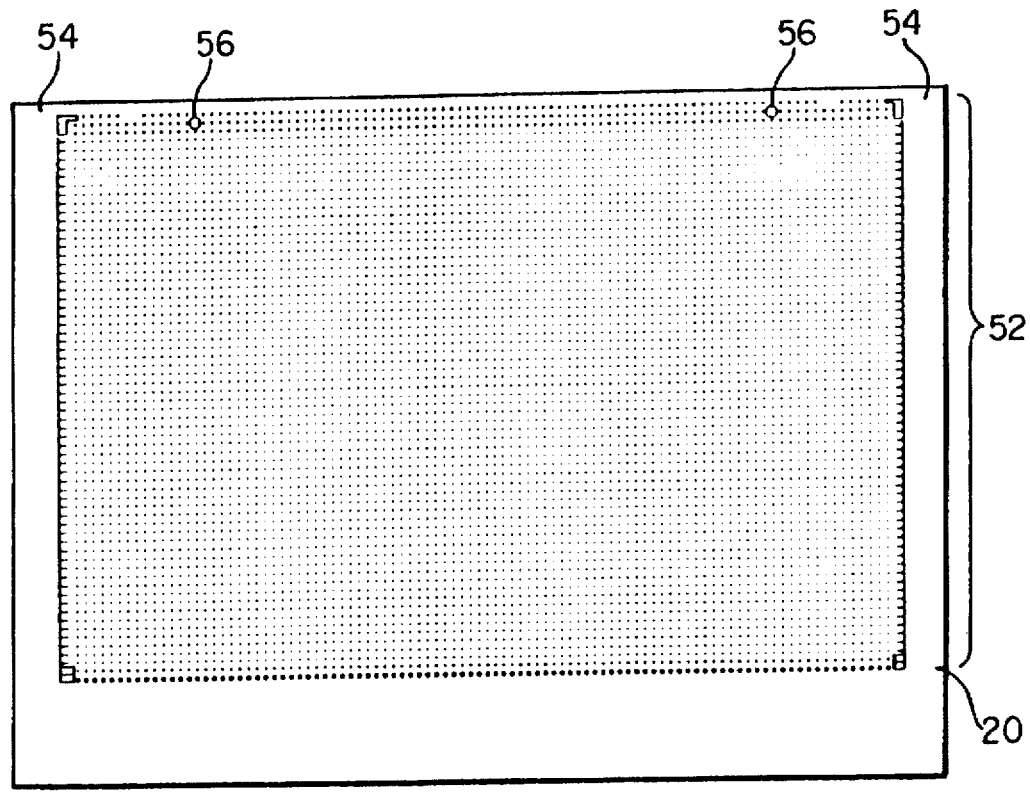
FIG. 5a is a flat view of a first embodiment of a mask of the first and second embodiments of the present invention in FIGS. 1a and 1b, respectively.
Figure 5B:
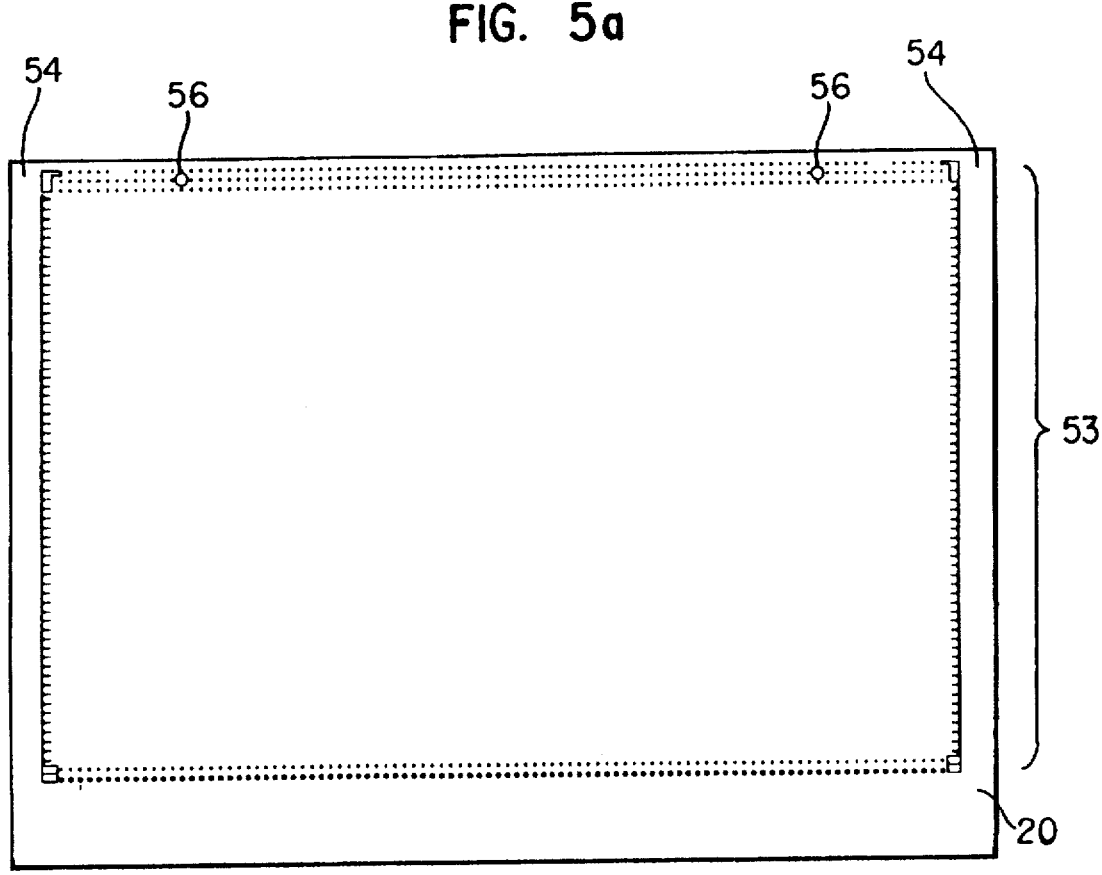
FIG. 5b is a flat view of a second embodiment of a mask of the first and second embodiments of the present invention in FIGS. 1a and 1b, respectively.

Referring now to FIG. 5a, a mask 20 of an embodiment of the present invention is illustrated. In accordance with the present invention, various sizes of substrate 26, including film media or aluminum sheet stock may be mounted on the drum 10 for plotting or scanning. This is accomplished by providing a mask 20 having plurality of holes 52 corresponding to the size of the substrate. An outer margin 54 of the mask is solid, that is, without holes, to provide an area over which the mask 20 will be suctioned onto the rotatable drum 10. Additional area will be solid to block off those holes which are located beyond the outer dimensions of the substrate 26 to be mounted. The mask 20 includes a plurality of holes 52 arranged in an array covering an area not greater than the area of the substrate 26 to be mounted on the drum 10. More particularly, in FIG. 5b, a mask 20 may include a plurality of holes 53 arranged so that when a substrate 26 is mounted on mask 20, the holes 53 lie beneath the substrate 26 and primarily along and within the perimeter of the substrate 26. A mask with holes only along and within the perimeter of the substrate as shown in FIG. 5b is useful for holding a light substrate, such as film. The mask with a plurality of holes covering the entire substrate area as shown in FIG. 5a is generally required to hold a heavier substrate such as an aluminum plate.

Referring again to FIG. 5a, the holes 52 in the mask 20 are spaced apart from each other in a similar fashion to the spacing of the holes 42 in the surface 16 of rotatable drum 10. The holes 52 in the mask 20 will include holes oriented to overlie the leading edge array of holes 44 as well as the holes 42 in the drum 10. Likewise, the mask 20 includes two precision located registration holes 56 for orientation in alignment with the registration holes 40 in the rotatable drum 10. Thus the registration holes 56 are available for use in properly aligning the substrate 26 on the drum 10. This particularly facilitates automatic mounting of the substrate 26 onto the drum 10.

The size of the holes in the mask 20 may vary from the size of the holes in the rotatable drum 10. The holes in the mask 20 may be larger or smaller than those in the drum 10. Moreover, the shape of the holes may vary between the mask 20 and drum 10. For example, the shape may be star-shaped, round, square, or any other geometric shape. It has been found that larger holes may be preferable in the mask 20 for mounting a stiffer substrate such as an aluminum printing plate on the rotatable drum 10, particularly along the leading edge. On the other hand, for mounting a delicate film media, it may be preferable to provide smaller holes in the mask 20 or provide holes in the mask only along and within the perimeter of the film media. Larger holes on such a delicate media may cause dimples in the media which could distort the image being plotted or scanned. The larger holes provide the vacuum pressure over a larger area and thus exert greater force for holding a stiffer material onto the rotatable drum 10.

In order to securely hold a substrate 26 on the rotating vacuum drum 10 with a vacuum, it is essential that the edges of the substrate 26 be held securely down against the mask 20. Therefore it is desirable, in certain cases, to make the holes around the outer edge of the plurality of holes 52 in the mask 20 larger than the majority of the remaining holes. It is desirable that the outer edge holes be located close to the edge of the substrate 26 without extending beyond the edge of the substrate 26. Besides making the edge holes larger, it has also been found useful to elongate the edge holes along the row closest to the trailing edge of the substrate 26. Large corner holes having an outer rectangular edge to fit closely against the corner edge of the substrate 26 are presently preferred for improving the vacuum hold upon the substrate 26 during rotation of the vacuum drum 10. It may also be desired to add reflective tape, such as aluminum foil, tape onto the mask outside the perimeter of the substrate. The reflective tape would frame the area for mounting the substrate. The reflective tape would protect the mask during printing from an imaging laser going beyond the edge of the substrate.

Figure 6:
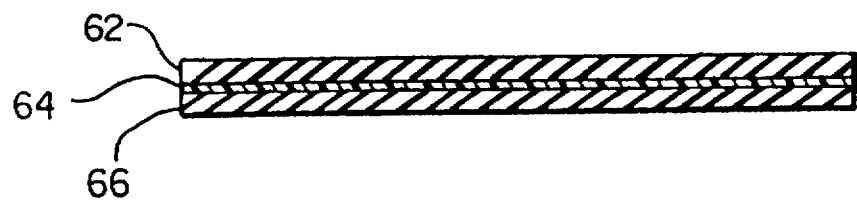
FIG. 6 is a cross-sectional view of the mask of FIGS. 5a and 5b.

A cross-section of the presently preferred mask 20 is shown in FIG. 6. The mask 20 is made of a three-layer material. The thickness of the mask 20 is uniform at least throughout the area on which the substrate 26 will be placed. The present embodiment is preferably about 30 thousandths of an inch thick. A top layer 62 is made of an elastomeric material such as rubber. It is desirable that the mask 20 have a resilient surface soft enough to act as a gasket to form a seal between the mask 20 and the substrate 26. This can advantageously replace the prior practice of the use of mechanical clamping to seal the substrate 26 to a drum surface.

The high speed rotation of the rotatable drum 10 may cause an elastomeric mask 20 to stretch and thus deform, thereby possibly distorting the scanning or plotting process. It is therefore preferred that the mask 20 include an inextensible layer 64. The middle layer of an embodiment of mask 20 is an inextensible layer 64 made of Mylar™ plastic. The inextensible layer 64 resists the centrifugal forces pulling on the mask 20 during rotation of the drum 10. A bottom layer 66 of the mask 20 is an elastomeric material including disbursed ferromagnetic particles.

A mask 20 is made by taking the desired mask material and cutting the plurality of holes 52 or 53 therein. The presently preferred method for precisely cutting the holes consists of laser cutting. Computer generated files can be used to accurately and consistently reproduce a hole array in proper alignment with drum holes and desired substrate location.

A mask 20 must be initially staged on the rotatable drum 10 prior to pulling the vacuum. The mask 20 will also need to be adhered to the drum 10 by some means other than vacuum when the substrate 26 is removed. Masks 20 can be mounted on the rotatable drum 10 without requiring mechanical clamps or other mechanical holding mechanisms to hold the mask 20 in place prior to full application of the vacuum. While such clamps may be used to attach the mask 20 within the scope of the present invention, it is preferred to use a hook and loop attachment such as Velcro™. Alternatively, an attractive force between the mask surface and the drum surface 16, such as magnetism or adhesion, may be used.

In the presently preferred embodiment, a hook and loop attachment may be used. For example, a mechanical hold can be obtained using adherent plastic strips of the type marketed under the name Velcro™ to hold the mask 20 on the drum 10. An alternative embodiment uses magnetic force to hold the mask 20 in position on the rotatable drum 10 when vacuum is off or being lost through open holes. Magnetic force may be achieved by providing ferromagnetic particles about the outer surface 16 of the rotatable drum 10 and in the mask 20 and magnetizing the particles in either the outer surface 16 of the drum 10 or the mask 20. Adhesive force may be provided by an appropriate adhesive coating on the mask 20.

Figures 7, 8:
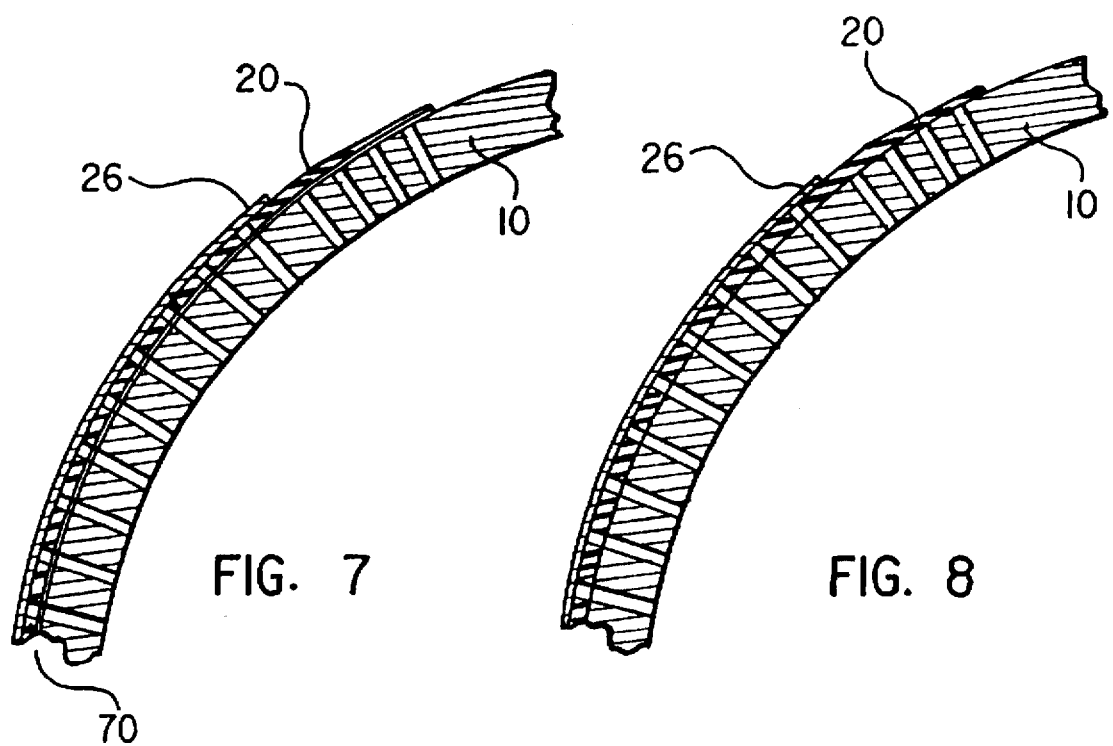
FIG. 7 is a partial cross-sectional view of a first embodiment of the vacuum drum of FIGS. 1a and 1b with a mask and a printing substrate mounted thereon.
FIG. 8 is a partial cross-sectional view of a second embodiment of a vacuum drum of FIGS. 1a and 1b with a mask and printing substrate thereon.

In the embodiment of FIG. 7, the drum 10 has been made of a non-ferromagnetic material. The drum 10 may be made from aluminum for example. The single wall aluminum drum 10 of the invention is advantageously lightweight enabling faster rotational acceleration and therefore greater printing speeds. A magnetic sheet 70 perforated with a plurality of holes so as to align with the plurality of holes 42 in the outer surface 16 of the drum 10 may be adhered about the outer surface 16 of the drum 10. The magnetic sheet 70 may be provided with an adhesive layer comprising glue or other adhesive material for securing it to the drum outer surface. The magnetic sheet 70 includes magnetic material and may be magnetized so that the mask 20 only need include magnetic particles. The mask 20 is then placed over the magnetic sheet 70 and held to the drum 10 by the magnetization forces when vacuum is not present. A substrate 26 is held over the plurality of holes 52 in the mask 20 by the vacuum pressure from inside the drum 10.

An alternative embodiment of the invention is shown in FIG. 8, the drum 10 is made with ferromagnetic material such as steel. The mask 20 including ferromagnetic particles is placed over the drum 20 and oriented with the use of the registration holes. Either the drum surface 16 or the ferromagnetic particles of the mask 20 are magnetized. A substrate may be mounted over the mask 20 to cover the array of holes 52 in the mask 20. The substrate is held to the mask 20 by the vacuum being pulled through the drum chamber 30.

It is a simple matter to modify the rotatable vacuum drum 20 apparatus of the invention for use with printing plates or film media of different sizes. It is only necessary to replace the mask 20 with a new mask 20 having an appropriate plurality of holes. Accurate placement of the mask 20 and substrate 26 is achieved by the registration holes in the mask 20 and substrate 26 and corresponding registration pins 22 on the drum 10 in manual loading as in FIG. 1a or the corresponding registration holes 40 in the drum 10 in automatic loading as in FIG. 1b. A circular surface is maintained by holding the mask 20 to the surface throughout by magnetic force and, if desired, by including an inextensible layer in the mask. Substrates of various thickness and stiffness are accommodated by varying the hole sizes within the mask 20. The mask 20 further improves the retention of the substrate on the rotatable drum surface by including a resilient surface which forms an improved seal between the substrate and the mask 20 without clamps.

In certain circumstances it may be more difficult to hold stiff substrates (e.g., aluminum plates) to the curved surface of the drum 10. One solution of the present invention is to provide flat attachment areas for the substrate and mask 20 leading edges.

Figure 9A:
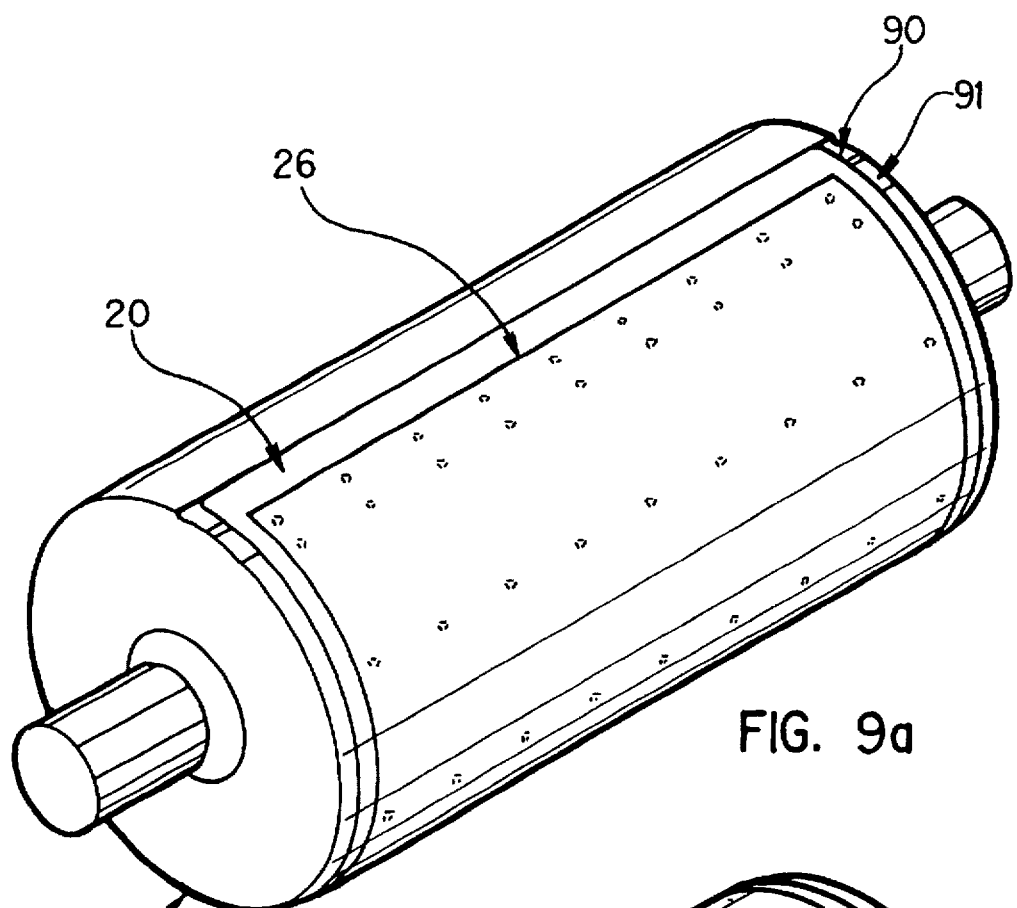
FIG. 9a is an isometric view of a preferred embodiment of a vacuum drum along with a mask and a substrate mounted thereon.
Figure 9B:
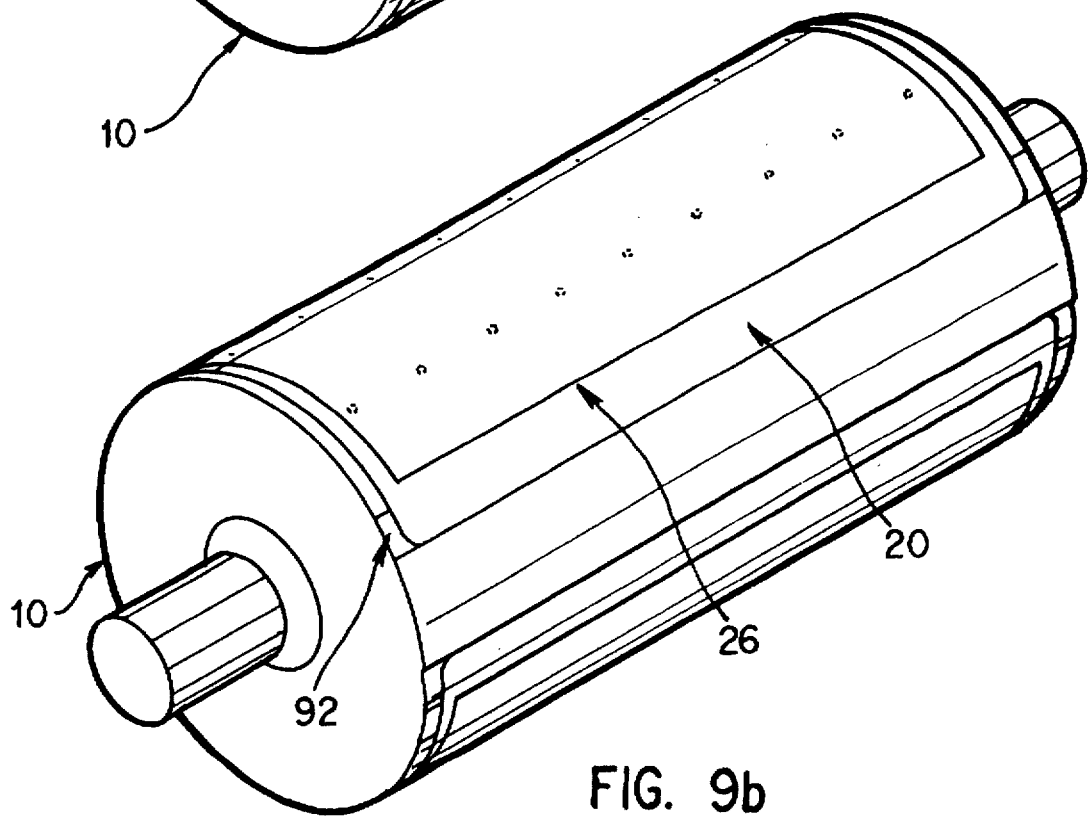
FIG. 9b is the vacuum drum of FIG. 9a rotated axially to show the location of a third flat surface on the drum.
Figure 9C:
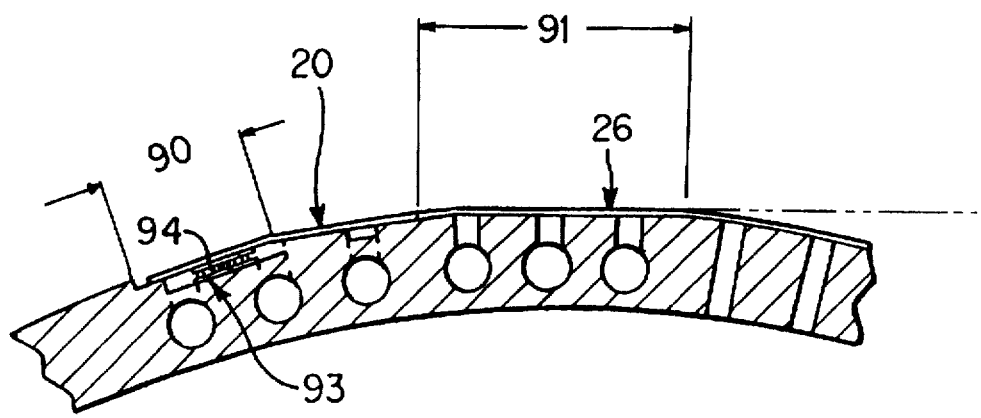

FIGS. 9a and 9b show isometric views of a preferred embodiment of a vacuum drum 10 of the present invention with three flat surfaces, 90 and 91 (in FIG. 9a) and 92 (in FIG. 9b), on the drum surface 16 along with a mask 20 and a substrate 26 mounted thereon. FIG. 9c shows a partial cross sectional view of the vacuum drum in accordance with the present invention. For a drum having a 12½ inch diameter, the flat surface of a preferred embodiment would be between about 1 and 1½ inches wide.

Referring again to FIG. 9a, the first flat surface 91 covers the leading edge holes 44. The leading edge vacuum pulls the leading edge of the substrate 26 onto the drum 10. The first flat surface 91 is located for receiving the leading edge of the substrate 26. The first flat surface 91 allows for pulling a significant leading edge vacuum on the mask 20 when it is being mounted on the drum 10. Having a flat surface 91 along the leading edge of the substrate 26, results in a reliable seal holding the substrate 26 to the mask 20 and drum 10. Although, the substrate 26 may be flexible, it is also flat making it easier to form a reliable seal against a flat surface. Mounting an edge of the substrate 26 onto the flat surface of the drum 10 makes the automatic loading process more reliable by significantly decreasing the tendency for the edge of the substrate 20 to pop off the drum 10. A second flat surface 90 may be included on the drum for covering a leading edge of the mask 20. Also, a third flat surface 92, may be located on the drum outer surface for receiving the trailing edge of the mask 20. The second and third flat surfaces may be provided with hook or loop fabric portions 93, characteristic of Velcro™, for making a mechanical attachment to the mask. The mask 20 would in such a case be provided with complementary hook or loop fabric portions 94 for completing the attachment. The hook and loop attachment of the mask to the drum would obviate the need for a magnetic or other adhesive attachment. Thus, the mask using the hook and loop attachment need not include a magnetic or adhesive layer. Alternatively, or in addition, leading edge holes may be included in the second flat surface 90 to help hold the mask down during staging of the substrate.

Figure 9D:
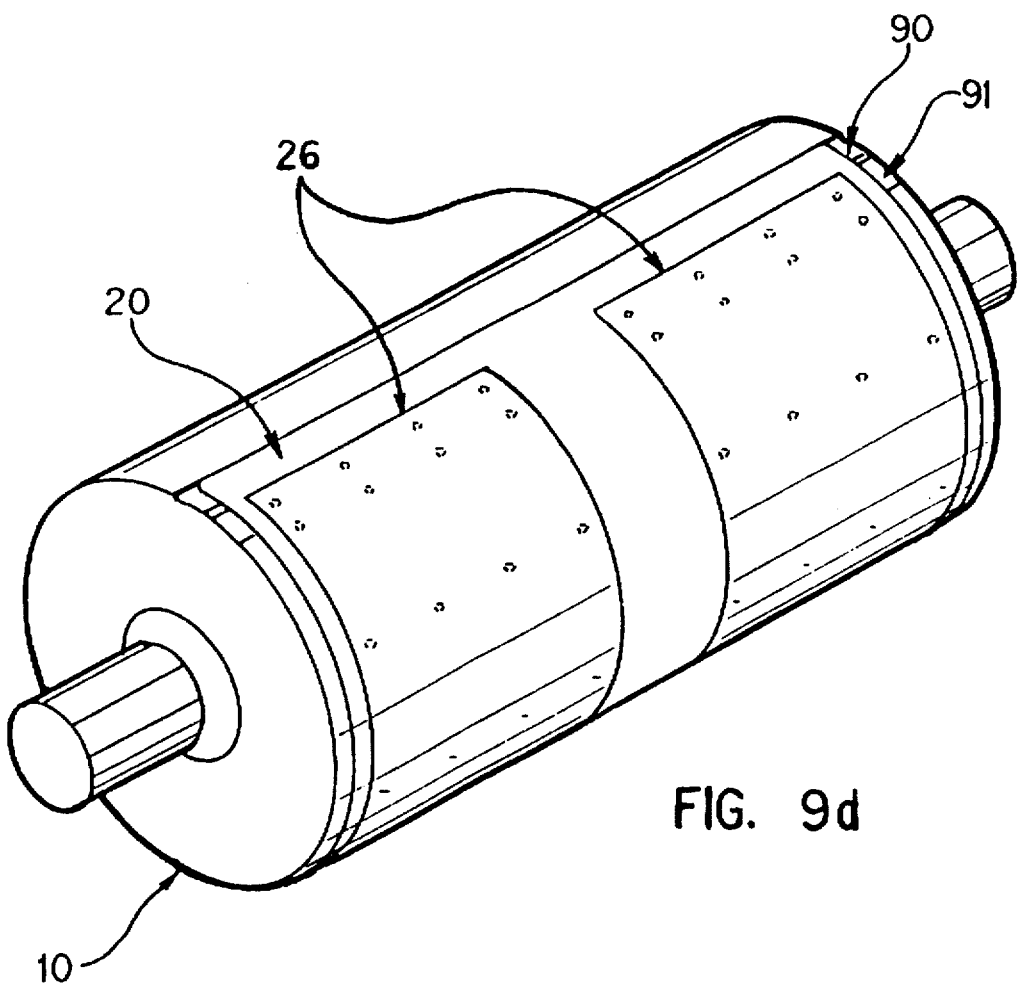
FIG. 9d is the vacuum drum of FIG. 9a having a mask and multiple substrates mounted thereon.

FIG. 9d illustrates an alternate embodiment of the vacuum drum 10 in FIG. 9a and b for mounting multiple substrates, along which a mask 20 and two substrates 26 mounted thereon. In this embodiment, the mask 20 includes a first plurality of holes for mounting a first substrate and a second plurality of holes for mounting a second substrate. The two substrates 26 are mounted on the drum side-by-side. The leading edge vacuum is provided to the leading edges of both substrates. Again, the three flat surfaces 90, 91, and 92 may be provided.

Figure 10:
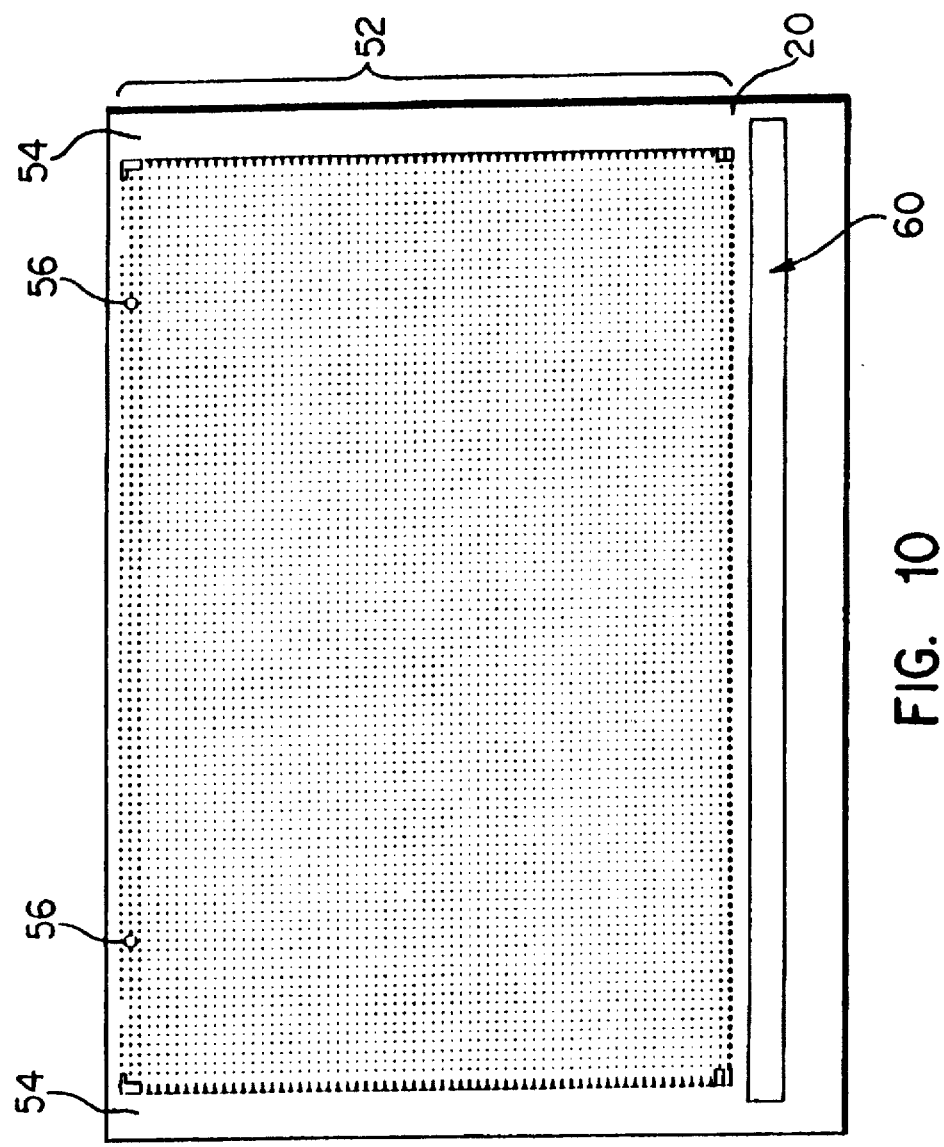
FIG. 10 generally shows a mask of FIGS. 5a and 5b with a counterweight directly attached to the mask surface.

FIG. 10 shows a mask 20 that has been preweighted by the attachment of a counterweight 60 directly to the surface of the mask 20. The counterweight 60 is used for balancing the weight distribution about the drum 10 having a mask 20 and substrate 26 mounted thereon. Including the counterweight 60 on the mask 20 eliminates the necessity for manually adjusting weights within the drum apparatus each time a mask 20 for different size (and type) substrate is used. Each mask 20 may have its own individual counterweight depending on the size and type of substrate it accommodates.

Physical weights are attached to the ends of the vacuum drum 10 to prebalance the vacuum drum 10 when a mask 20 that has no holes is mounted on it. Thereafter, the counterweight 60 attached directly to each mask 20 is used to compensate for the additional unbalanced weight when a mask 20 with holes and a substrate are mounted on the vacuum drum 10.

The counterweight 60 is usually a thin material in the form of a ribbon attached to the mask 20. The position of this counterweight 60 on the mask 20 is dependent upon both the size and type of substrate being mounted on the mask 20.

The counterweight 60 may be adhesively attached to the mask 20 by gluing, bonding, or some other means. The counterweight 60 may be adhesive-backed tape or ribbon of metallic lead.

Figure 11A:
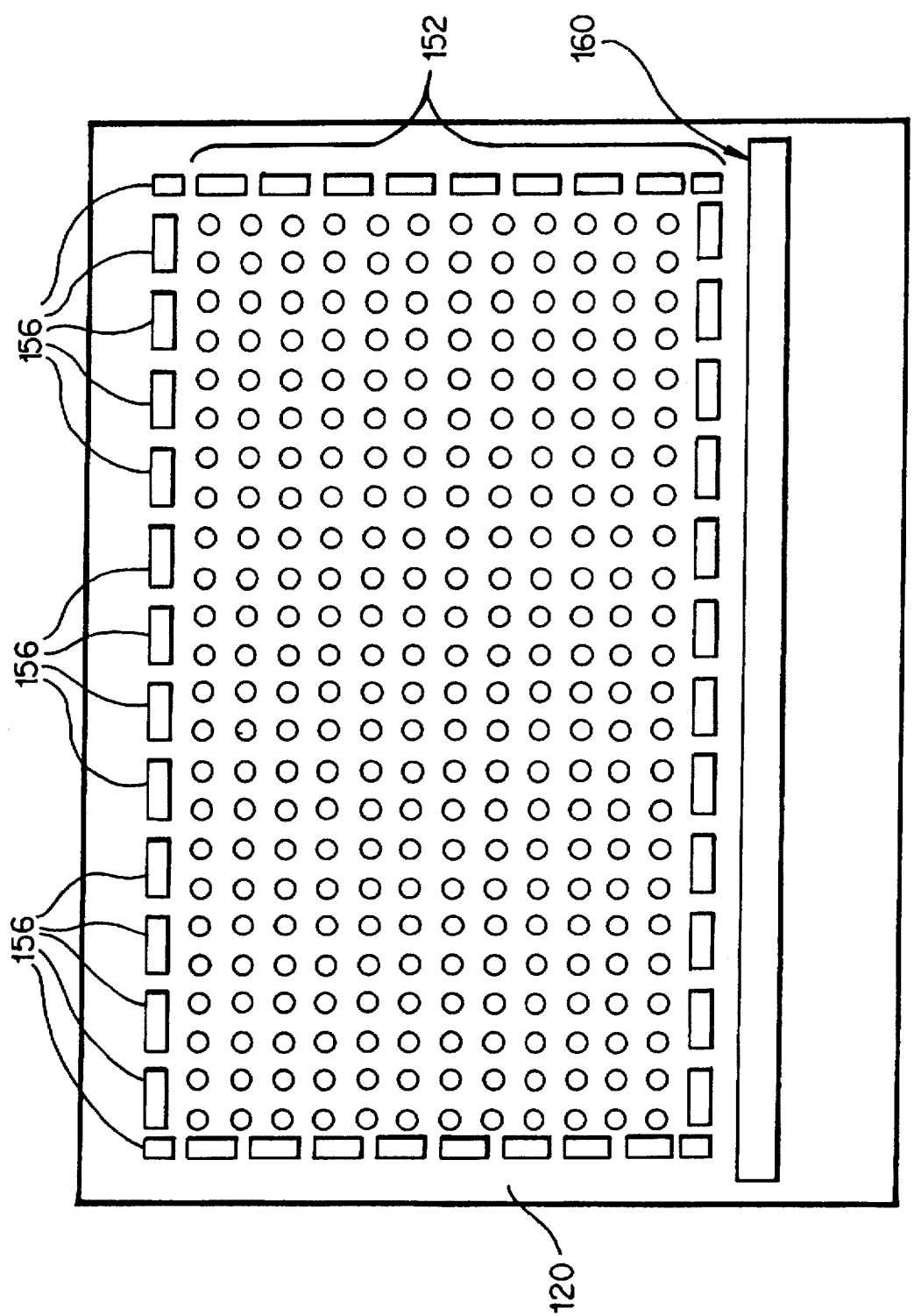
FIG. 11a is a plan view of an alternate embodiment of a mask of the present invention.
Figure 11B:
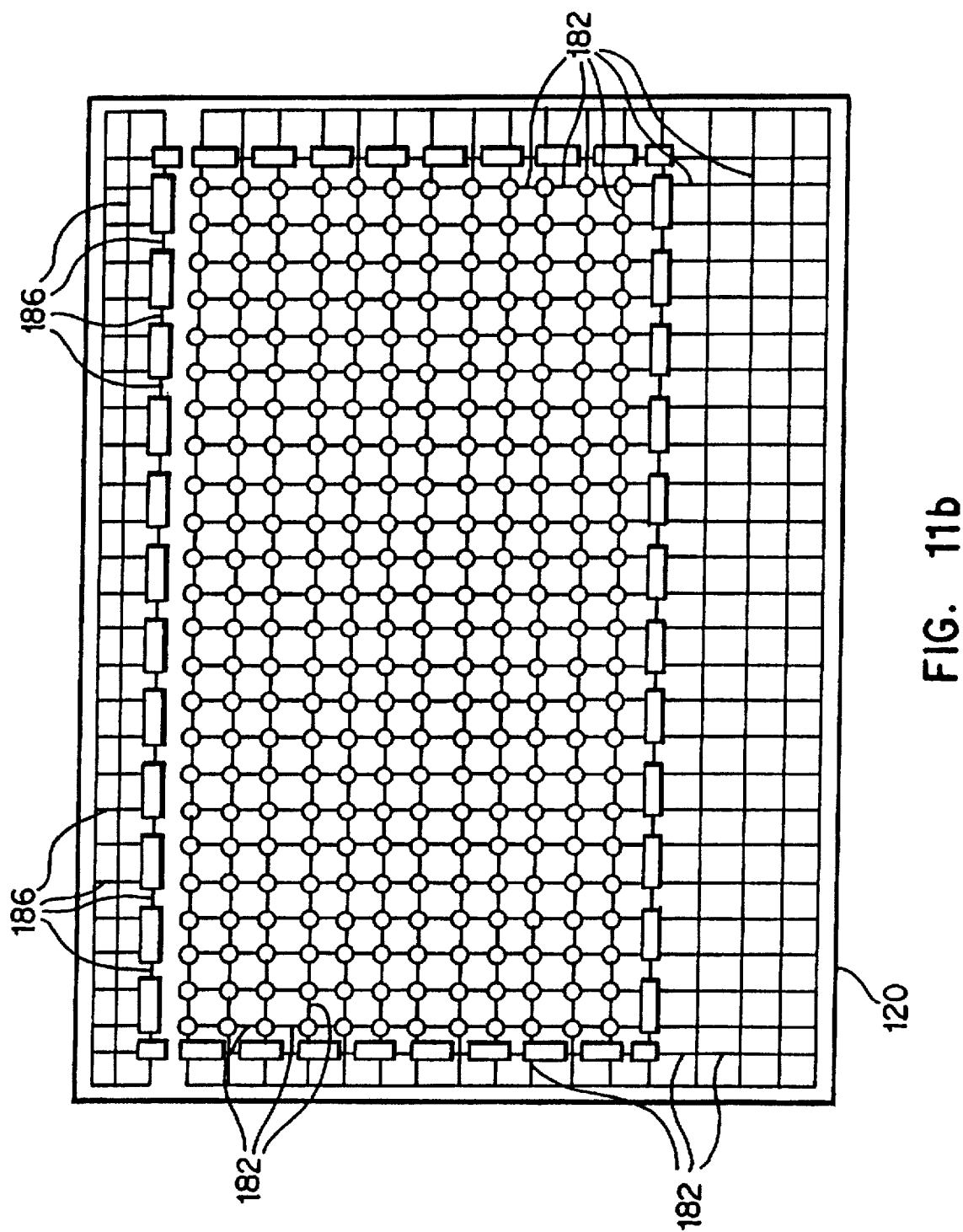

FIGS. 11a and 11b illustrate an alternate embodiment of a removable mask 120. FIG. 11a shows the outer surface of the mask. The surface includes a plurality of holes 152. The holes may also include a leading edge linear array of rectangular holes 156. A counterweight 160 may be attached to the mask to balance the weight about the drum apparatus.

The reverse side of the mask 120 for contacting the outer drum surface is shown in FIG. 11b. The plurality of holes 152 are connected by grooves 182 which provide passageways for fluid communication. Each groove may be, for example, 0.04 inches deep and 0.12 inches wide. The leading edge array of holes 156 may be connected by a separate network of grooves 186. The use of grooves in the underside of the mask significantly reduces the number of holes required in the outer surface of the vacuum drum. It may be possible to provide suction to a network of grooves and holes through a single hole or opening in the drum. Thus, one hole or set of holes may be used to provide low pressure suction to the leading edge array of holes 156 and a second hole or set of holes may provide low pressure to the plurality of holes 152. The network of grooves advantageously conveys the low pressure suction to all of the holes in the connected network.

Of course, it should be understood that various changes and modifications to the preferred embodiments described above will be apparent to those skilled in the art. For example, any one or more of the mask layers in the preferred embodiment could be deleted. The inextensible layer may be achieved by a web rather than a sheet. A suitable mask material is manufactured under the name LASERFLEX by Fulflex, Inc. of Middletown, R.I. This material includes an inextensible nylon layer of 0.005 inches thick sandwiched between two elastomeric layers of neoprene, each 0.010 inches thick. A magnetic layer is not included. These and other changes can be made without departing from the spirit and the scope of the invention and without diminishing its attendant advantages. It is therefore intended that such changes and modifications be covered by the following claims.

I claim:

1. A vacuum drum apparatus comprising:
   a first end plate;
   a second end plate;
   an outer drum surface disposed between the first end plate and the second end plate, said outer drum surface including a circular cylindrical surfaces, a first flat surface and a second flat surface, said cylindrical surface and said first and second flat surfaces all being disposed between the first end plate and the second end plate, the second flat surface being spaced apart from the first flat surface;
   a vacuum conduit beneath said outer drum surface in fluid communication with at least one hole through said outer drum surface;
   a vacuum chamber beneath said outer drum surface in fluid communication with a first array of holes through the circular cylindrical surface of said outer drum surface; and
   a second array of holes in the second flat surface in fluid communication with said vacuum conduit, said second array of holes for use in adhering a leading edge of a mask to said outer drum surface.

2. The vacuum drum apparatus of claim 1 wherein the at least one hole comprises a leading edge array of holes for use to adhere a leading edge of a substrate to the mask and the first flat surface.

3. The vacuum drum apparatus of claim 1 further comprising a third flat surface on the outer drum surface, said third flat surface disposed between the end plates and spaced apart from the first and second flat surfaces for mounting a trailing edge of the mask to the outer surface of the drum.

4. A vacuum drum apparatus comprising:
   a circular cylinder mounted for rotation about its axis, said circular cylinder having an outer surface with at least a portion of the outer surface being made of a porous material and a first flat surface on said outer surface;

means for applying a first low pressure to said first flat surface;

means for applying a second low pressure to said circular cylinder; a removable mask; and means for aligning said removable mask about said outer surface of said circular cylinder, said mask having a plurality of holes including an array of leading edge holes such that all but a portion of said circular cylinder is sealed by said mask and the array of leading edge holes are aligned over said first flat surface in fluid communication with the first low pressure.

5. The vacuum drum apparatus of claim 4 wherein said means for applying a second low pressure comprises a hollow chamber within said circular cylinder and a passageway extending along the axis of said circular cylinder from the hollow chamber through a side of said circular cylinder.

6. The vacuum drum apparatus of claim 5 wherein said means for aligning comprises at least two precision placed registration pins in said outer surface of said circular cylinder.

7. A vacuum drum apparatus comprising:

a drum mounted for rotation about its axis, said drum having an outer drum surface including a circular cylindrical surface and a first axially directed flat surface;

a vacuum conduit beneath said outer drum surface in fluid communication with a first at least one hole through the first axially directed flat surface;

a vacuum chamber, unconnected to said vacuum conduit, beneath said outer drum surface in fluid communication with a second at least one hole through the circular cylindrical surface; and a removable mask, having at least one leading edge hole and at least one trailing hole, mounted on the outer drum surface with the at least one leading edge hole in fluid communication with the first at least one hole and the at least one trailing hole in fluid communication with the second at least one hole.

8. The vacuum drum apparatus of claim 7 wherein the second at least one hole comprises an array of holes in the circular cylindrical surface.

9. The vacuum drum apparatus of claim 8 further comprising means for aligning said removable mask with the at least one trailing hole in alignment with a portion of the holes in the array of holes in the circular cylindrical surface such that all but said portion of holes in the array of holes in the circular cylindrical surface are sealed by said mask.

10. The vacuum drum apparatus of claim 7 wherein the at least one leading edge hole comprises a leading edge array of holes for use to adhere a leading edge of a substrate to said mask and the first axially directed flat surface.

11. The vacuum drum apparatus of claim 7 further comprising a second axially directed flat surface on the outer drum surface, the second axially directed flat surface being spaced apart from the first axially directed flat surface.

12. The vacuum drum apparatus of claim 11 further comprising a third axially directed flat surface on the outer drum surface, the third axially directed flat surface being spaced apart from the first and second axially directed flat surfaces for mounting a trailing edge of said mask to the outer surface of said drum.

13. The vacuum drum apparatus of claim 11 further comprising a third at least one hole in the second flat surface connected to said vacuum chamber, the third at least one hole being used to adhere a leading edge of said mask to the outer surface of said drum.

14. The vacuum drum apparatus of claim 9 wherein said means for aligning comprises at least two precision placed registration pins in the first axially directed flat surface.

15. The vacuum drum apparatus of claim 14 wherein said registration pins are tapered.

16. The vacuum drum apparatus of claim 9 wherein said means for aligning comprises at least two precision placed registration holes in the first axially directed flat surface.

17. A vacuum drum apparatus comprising:

a drum mounted for rotation about its axis, said drum having an outer drum surface including a circular cylindrical surface and a first axially directed flat surface;

a vacuum conduit beneath the outer drum surface in fluid communication with a first at least one hole through the first axially directed flat surface;

a removable mask, having at least one leading edge hole, mounted on the outer drum surface with the leading edge hole in fluid communication with the first at least one hole; and a flat flexible substrate secured to said removable mask above the first axially directed flat surface by application of a low pressure within said vacuum conduit.

18. The vacuum drum apparatus of claim 17 further comprising a vacuum chamber, unconnected to said vacuum conduit, beneath the outer drum surface in fluid communication with a second at least one hole through the circular cylindrical surface.

19. The vacuum drum apparatus of claim 18 wherein the second at least one hole comprises an array of holes in the circular cylindrical surface.

20. The vacuum drum apparatus of claim 19 wherein said removable mask further includes a plurality of trailing holes and said vacuum drum apparatus further comprises means for aligning said removable mask with the plurality of trailing holes in alignment with a portion of the holes in the array of holes in the circular cylindrical surface such that all but said portion of holes in the array of holes in the circular cylindrical surface are sealed by said mask.

21. The vacuum drum apparatus of claim 17 further comprising a second axially directed flat surface on the outer drum surface, the second axially directed flat surface being spaced apart from the first axially directed flat surface.

22. The vacuum drum apparatus of claim 21 further comprising a third axially directed flat surface on the outer drum surface having a plurality of trailing edge holes therethrough, the third axially directed flat surface being spaced apart from the first and second axially directed flat surfaces for mounting a trailing edge of said mask to the outer surface of said drum.

* * * * *

UNITED STATES PATENT AND TRADEMARK OFFICE
CERTIFICATE OF CORRECTION

PATENT NO. : 5,758,874
DATED : June 2, 1998
INVENTOR(S) : Roger J. Morrissette

It is certified that error appears in the above-identified patent and that said Letters Patent is hereby corrected as shown below:

Column 10, line 37, change "surfaces" to --surface--

Signed and Sealed this

Eighth Day of September, 1998

*Attest:*

BRUCE LEHMAN

*Attesting Officer*     *Commissioner of Patents and Trademarks*